US012720545B2

(12) United States Patent
Gou et al.

(10) Patent No.: US 12,720,545 B2
(45) Date of Patent: Aug. 25, 2026

(54) TRANSMISSION SCHEDULING FOR TIME DIVISION DUPLEXING SYSTEMS

(71) Applicant: ZTE Corporation, Shenzhen (CN)

(72) Inventors: Wei Gou, Shenzhen (CN); Xianghui Han, Shenzhen (CN); Xingguang Wei, Shenzhen (CN); Shuaihua Kou, Shenzhen (CN); Kai Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 295 days.

(21) Appl. No.: 18/536,541

(22) Filed: Dec. 12, 2023

(65) Prior Publication Data

US 2024/0114509 A1 Apr. 4, 2024

Related U.S. Application Data

(63) Continuation of application No. PCT/CN2022/086964, filed on Apr. 15, 2022.

(51) Int. Cl.
*H04W 72/1273* (2023.01)
*H04W 72/232* (2023.01)
(Continued)

(52) U.S. Cl.
CPC ..... *H04W 72/1273* (2013.01); *H04W 72/232* (2023.01); *H04W 72/51* (2023.01); *H04W 76/20* (2018.02)

(58) Field of Classification Search
CPC . H04W 72/1273; H04W 76/20; H04W 72/51; H04W 72/232
See application file for complete search history.

(56) References Cited

U.S. PATENT DOCUMENTS

2013/0259012 A1* 10/2013 Gormley ........... H04W 72/0473 370/336
2016/0353436 A1 12/2016 Au et al.
(Continued)

FOREIGN PATENT DOCUMENTS

CN 110463306 A 11/2019
CN 112566257 A 3/2021
(Continued)

OTHER PUBLICATIONS

Japanese Notice of Allowance with English translation regarding Japanese Appl. No. JP2023578095 dated Jul. 29, 2025, 4 pages.
(Continued)

*Primary Examiner* — Ajay Cattungal
(74) *Attorney, Agent, or Firm* — Crowell & Moring LLP

(57) ABSTRACT

Methods, apparatus, and systems that enable scheduling of data transmissions for both half-duplex and full-duplex transmissions in Time Division Duplexing (TDD) systems are disclosed. In one example aspect, a method for wireless communication includes receiving, by a terminal device, scheduling information from a base station indicating a resource for a transmission in a first direction, the resource comprising at least one symbol configured for use in a second direction that is different than the first direction, and performing, by the terminal device, the transmission with the base station in the first direction using the at least one symbols in the resource.

12 Claims, 10 Drawing Sheets

(51) Int. Cl.
*H04W 72/51* (2023.01)
*H04W 76/20* (2018.01)

(56) References Cited

U.S. PATENT DOCUMENTS

| | | | | |
|---|---|---|---|---|
| 2018/0367289 | A1 | 12/2018 | Kim et al. | |
| 2020/0146064 | A1* | 5/2020 | Oh | H04W 74/0808 |
| 2020/0154415 | A1* | 5/2020 | Oh | H04W 72/53 |
| 2021/0377938 | A1* | 12/2021 | Huang | H04W 72/1263 |
| 2022/0006603 | A1 | 1/2022 | Lei et al. | |
| 2022/0231808 | A1* | 7/2022 | Oh | H04L 5/0048 |
| 2022/0361231 | A1* | 11/2022 | Oh | H04L 1/189 |
| 2023/0217478 | A1* | 7/2023 | Oh | H04L 1/0003 370/329 |
| 2025/0211404 | A1* | 6/2025 | Zhu | H04L 5/0044 |

FOREIGN PATENT DOCUMENTS

| | | | |
|---|---|---|---|
| CN | 113543337 | A | 10/2021 |
| JP | 2018517363 | A | 6/2018 |
| JP | 2021516890 | A | 7/2021 |
| WO | WO 2020066006 | | 4/2020 |
| WO | WO 2020100787 | | 5/2020 |
| WO | WO 2021162534 | | 8/2021 |
| WO | WO2022035643 | A1 | 2/2022 |
| WO | WO2023168588 | A1 | 9/2023 |

OTHER PUBLICATIONS

Extended European Search Report regarding EP 22 93 6927 dated Jan. 24, 2025, 11 pages.

International Search Report and Written Opinion regarding PCT/CN2022/086964 dated Nov. 28, 2022, 6 pages.

Nokia et al., "Clarifications to the NR TDD configuration," *3GPP TSG-RAN WG2 Meeting* #101 R2-1804772, Apr. 20, 2018, 8 pages.

Japanese-language Office Action with English translation regarding 2023-578095 dated Jan. 28, 2025 (11 pages).

LG Electronics, Motivation for new SI: Study on Full Duplex Operation for NR, 3GPP TSG RAN adhoc_2021_06_RAN_Rel18_WS RWS-210241, Internet <URL:https://www.3gpp.org/ftp/tsg_ran/TSG_RAN/TSGR_AHs/2021_06_RAN_Rel18_WS/Docs/RWS-210241.zip>, Jun. 7, 2021, 20 pages.

* cited by examiner

TRANSMISSION SCHEDULING FOR TIME DIVISION DUPLEXING SYSTEMS

CROSS-REFERENCE TO RELATED APPLICATION

This application is a continuation application of PCT International Patent Application No. PCT/CN2022/086964, filed with the China National Intellectual Property Administration, PRC on Apr. 15, 2022, which is herein incorporated by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable scheduling of data transmissions for both half-duplex and full-duplex transmissions in Time Division Duplexing (TDD) systems are disclosed.

In one example aspect, a method for wireless communication includes receiving, by a terminal device, scheduling information from a base station indicating a resource for a transmission in a first direction, the resource comprising at least one symbol configured for use in a second direction that is different than the first direction, and performing, by the terminal device, the transmission with the base station in the first direction using the at least one symbols in the resource.

In another example aspect, a method for wireless communication includes transmitting, by a base station, scheduling information to a user equipment indicating a resource for a transmission in a first direction, the resource comprising at least one symbol configured for use in a second direction that is different than the first direction, and performing, by the base station, the transmission with the terminal device in the first direction using the at least one symbols in the resource.

In another example aspect, a method for wireless communication includes receiving, by a terminal device, configuration information from a base station configuring one or more sub-bands in a carrier for performing a transmission in a first direction, the one or more sub-bands including at least one symbol configured for use in a second direction that is different than the first direction, receiving, by the terminal device subsequent to receiving the configuration information, a signaling message from the base station indicating a selection of a sub-band from the one or more sub-bands or an adjustment of the one or more sub-bands for performing the transmission based on the configuration information, and performing, by the terminal device, the transmission with the base station using the sub-band.

In another example aspect, a method for wireless communication includes transmitting, by a base station, configuration information to a terminal device configuring one or more sub-bands in a carrier for performing a transmission in a first direction, the one or more sub-bands including at least one symbol configured for use in a second direction that is different than the first direction, transmitting, by the base station subsequent to transmitting the configuration information, a signaling message to the terminal device indicating a selection of a sub-band from the one or more sub-bands or an adjustment of the one or more sub-bands for performing the transmission based on the configuration information, and performing by the base station, the transmission with the terminal device using the sub-band.

In another example aspect, a communication apparatus is disclosed The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
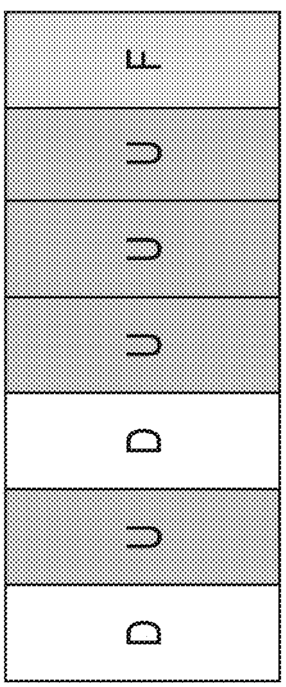
FIG. 1 illustrates an example radio frame structure for Time Division Duplexing transmissions.

For TDD communication, a single frequency band is used for both transmit and receive data. FIG. 1 illustrates an example radio frame structure 100 for TDD transmissions. The spectrum resources are divided into downlink (e.g., from the base station to the terminal device) and uplink (e.g., from the terminal device to the base station) in the time domain. That is, only uplink or downlink can be performed at a given time in TDD systems (also known as half-duplex, communication in only one direction at a time).

While TDD systems do not support simultaneous communication in both directions (also known as full-duplex), they can be configured to have adjacent time-domain units in both directions (with guard bands in between) to emulate a full-duplex experience so as to improve the transmission efficiency for TDD systems. Supporting full-duplex transmissions can lead to increased cost and complexity for both the base station and the terminal devices. Often times it is possible to handle such complexity at the base station side, but performing full-duplex transmissions at the terminal device side can result in increased cost and power consumption, potentially leading to deteriorated user experience. Therefore, a split solution that allows the base stations to support full-duplex TDD transmissions while the terminal devices continue to support half-duplex TDD transmissions is more desirable for the improvement of transmission efficiency of TDD systems. This patent document discloses techniques that can be implemented in various embodiments to enable scheduling of data transmissions for both half-duplex and full-duplex TDD transmissions. In particular, the base station can configure selected sub-bands in a carrier to be dedicated to downlink or uplink transmissions. The UE can perform transmissions in the designated direction according to the sub-band configuration without checking the symbol directions in the sub-band. For example, a sub-band can be configured as downlink sub-band yet the sub-band includes some uplink/flexible symbols. The UE can perform downlink transmissions using the sub-band without the need to check whether the transmissions need to be canceled for the uplink/flexible symbols. As another example, a sub-band can be configured as uplink sub-band yet the sub-band includes some downlink/flexible symbols. The UE can perform uplink transmissions using the sub-band without the need to check whether the transmissions need to be canceled for the downlink/flexible symbols.

Embodiment 1

Figure 2A:
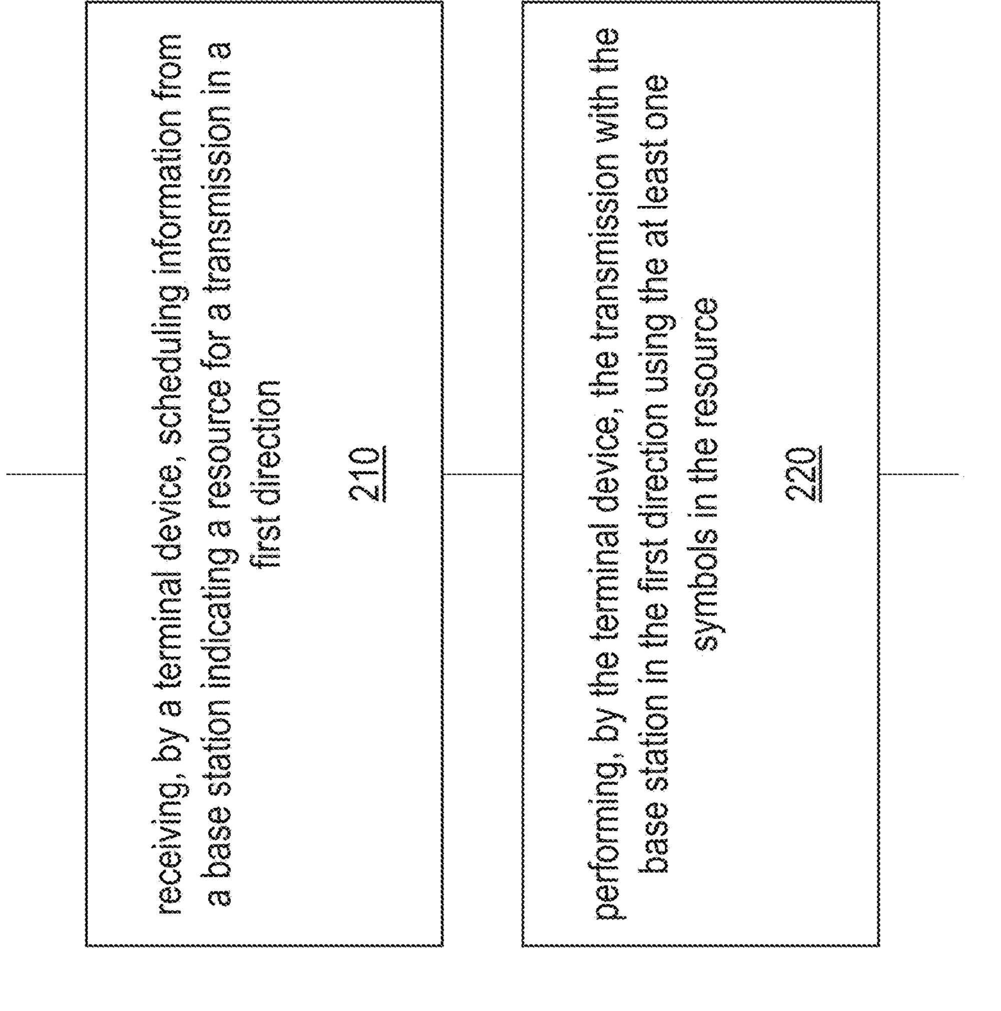
FIG. 2A is a flowchart representation of a method for wireless communication in accordance with one or more embodiments of the present technology.

In some scenarios, the terminal device or User Equipment (UE) can support the split full-duplex and half-duplex transmission scheme but is not aware of the configured sub-bands in the carrier. The base station can indicate the transmission scheme in the scheduling information to facilitate efficiency transmissions. FIG. 2A is a flowchart representation of a method 200 for wireless communication in accordance with one or more embodiments of the present technology. The method 200 includes, at operation 210, receiving, by a terminal device, scheduling information from a base station indicating a resource for a transmission in a first direction. The resource comprises at least one symbol configured for use in a second direction that is different than the first direction. The method 200 also includes, at operation 220, performing, by the terminal device, the transmission with the base station in the first direction using the at least one symbols in the resource. In some embodiments, the method also includes reporting, by the terminal device, capability information to the base station indicating support for performing transmissions in the first direction using the resource.

Figure 2B:
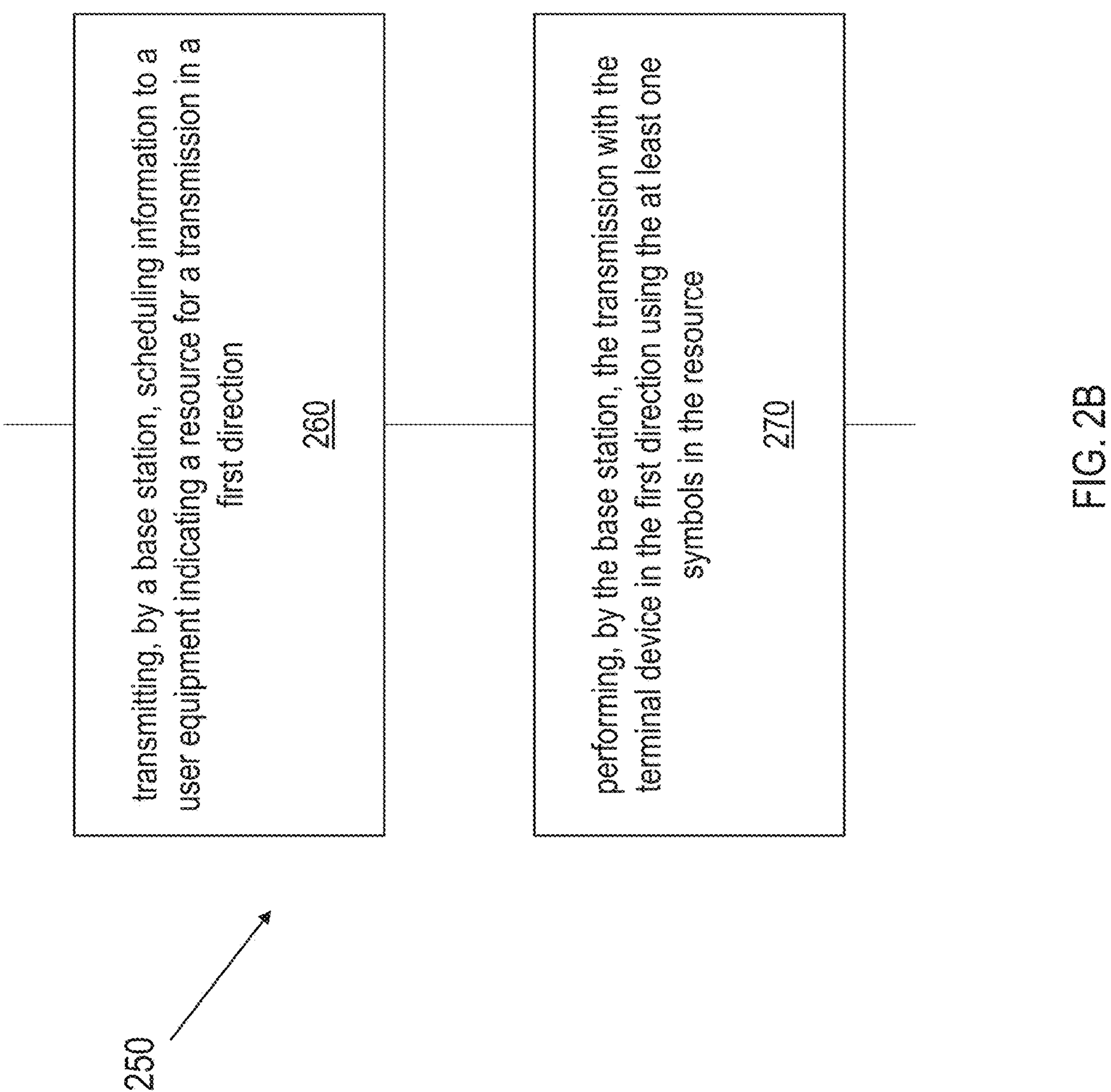
FIG. 2B is a flowchart representation of another method for wireless communication in accordance with one or more embodiments of the present technology.

FIG. 2B is a flowchart representation of a method 250 for wireless communication in accordance with one or more embodiments of the present technology. The method 250 includes, at operation 260, transmitting, by a base station, scheduling information to a user equipment indicating a resource for a transmission in a first direction. The resource comprises at least one symbol configured for use in a second direction that is different than the first direction. The method 250 also includes, at operation 270, performing, by the base station, the transmission with the terminal device in the first direction using the at least one symbols in the resource. In some embodiments, the method also includes receiving, by the base station, capability information from the terminal device indicating support for performing transmissions in the first direction using the resource.

In some embodiments, the scheduling information is carried in a Downlink Control Information signaling. The first direction can an uplink direction from the terminal device to the base station or a downlink direction from the base station to the terminal device. The second direction can be the opposite transmission different—the downlink direction from the base station to the terminal device and the uplink direction from the terminal device to the base station.

In some embodiments, the base station can inform the terminal device or the UE of the sub-band configuration. The base station can send, and the terminal device can receive configuration information for a sub-band of a carrier in a Radio Resource Control (RRC) signaling. The configuration information specifies that the sub-band is configured for transmissions in the first direction, and the resource for the transmission is positioned in the sub-band. The sub-band includes symbols for use in the second direction.

Some examples of the disclosed techniques are further described below.

UE Capability Reporting

In order to enable the base station to transmit appropriate scheduling information, the UE can report its capability for supporting the split transmission scheme. In some embodiments, a UE capability information element or signaling message can be introduced to indicate that the UE supports control signaling or data transmission in a scheduled resource positioned in a configured sub-band for uplink or downlink transmission even if the direction of the symbols in the resource is opposite to the transmission direction of the control signaling or data. In some embodiments, a UE capability information element or signaling message can be introduced to indicate that the UE supports control signaling or data transmission in a configured sub-band for uplink or downlink transmission even if the direction of the symbols in the sub-band is opposite to the transmission direction of the control signaling or data. In some embodiments, a UE capability information element or signaling message can be introduced to indicate that the UE supports control signaling or data transmission in a scheduled resource for uplink or downlink transmission even if the direction of the symbols in the resource is opposite to the transmission direction of the control signaling or data.

Upon receiving the UE's capability information, the base station can proceed to configuring a sub-band and/or scheduling the UE to send or receive data/control information using a resource within the sub-band. For example, the base station can schedule the UE to perform a downlink transmission using resource B in a sub-band (that is, the UE is scheduled to receive downlink control information or data in the scheduled resource B in a sub-band). However, resource B includes several symbols configured as uplink symbols. Given the UE's capability and the scheduling information, the UE does not need to perform any checks of the symbol direction and can perform the downlink transmission using the uplink symbols in resource B. As another example, the base station can schedule the UE to perform a uplink transmission using resource B in a sub-band (that is, the UE is scheduled to transmit uplink control information or data in the scheduled resource B in a sub-band). However, resource B includes several symbols configured as downlink symbols. Given the UE's capability and the scheduling information, the UE does not need to perform any checks of the symbol direction and can perform the uplink transmission using the downlink symbols in resource B.

If the UE does not report its capability to the base station or the base station does not receive any UE capability information regarding the split transmission scheme, the base station can refrain from scheduling the UE using such resources.

Sub-Band Configuration

In response to the UE capability information, the base station can configure a downlink or an uplink sub-band of a carrier/cell for the UE in the frequency domain as mentioned above. For example, the size of a sub-band bandwidth can be configured in the frequency domain, and the symbols that the sub-band includes can be configured in the time domain. The symbols can be a combination of one or more types of symbols as shown in FIG. 1, such as downlink symbols (D), uplink symbols (U), and flexible symbols (F). The configuration can be transmitted using Radio Resource Control (RRC) signaling.

The sub-band be configured to be used for transmissions in a particular direction but still includes symbols in the opposite direction. For example, a configured downlink sub-band can include uplink symbols, but the UE that supports the split transmission scheme can perform downlink transmission using the sub-band regardless of the uplink and/or flexible symbols in the sub-band. As another example, a configured uplink sub-band can include downlink symbols. A UE that supports the split transmission scheme can perform uplink transmission using the sub-band regardless of the downlink and/or flexible symbols in the sub-band.

Scheduling Information Indication

In some embodiments, once the base station configures one or more sub-bands for the transmission, the base station uses existing DCI format(s), such as DCI 0-0, DCI 0-1, DCI 0-2, DCI 1-0, DCI 1-1, DCI 1-2, etc., to indicate the scheduling information. If the UE does not support the split transmission scheme and receives scheduling information using one of the existing DCI formats, the UE can check the direction(s) of the symbols and cancel the transmission in the symbols that have the opposite direct.

In some cases, however, the UE supports the split transmission scheme but is not aware of the sub-band configurations. The UE can nonetheless perform appropriate transmissions using resources according to the scheduling information. The base station can adopt a new DCI format or introduce a new parameter to indicate scheduling information for the split transmission scheme. For the case where the UE is not configured with a sub-band for the split transmission scheme, the scheduling information can indicate a resource (e.g., resource E) for the UE to perform the transmission (e.g., an uplink/downlink transmission) and the action for the UE to take based on the new format or the new parameter. For example, based on the value of the parameter (e.g., 0), the UE can perform the uplink transmission as scheduled using resource E even if resource E includes downlink symbols. When the parameter has a different value (e.g., 1), the UE can perform the uplink transmission using the uplink symbols in resource E but cancel the transmission in the downlink symbols of resource E. In some embodiments, based on the value of the parameter (e.g., 2), the UE can cancel the uplink transmission if the UE detects that resource E includes downlink symbols. As another example, based on the value of the parameter (e.g., 0), the UE can perform the downlink transmission as scheduled using resource E even if resource E includes uplink symbols. When the parameter has a different value (e.g., 1), the UE can perform the downlink transmission using the downlink symbols in resource E but cancel the transmission in the uplink symbols of resource E. In some embodiments, based on the value of the parameter (e.g., 2), the UE can cancel the downlink transmission if the UE detects that resource E includes uplink symbols.

In some embodiments, the UE supports the split transmission scheme and the UE is configured with sub-band(s) for the split transmission scheme (e.g., without being configured with specific resource(s) in the sub-band(s)). The UE can perform appropriate transmissions in the sub-band according to the scheduling information. The base station can adopt a new DCI format or introduce a new parameter to indicate scheduling information for the split transmission scheme. For the case where the UE is configured with an aforementioned sub-band, the scheduling information can indicate the sub-band for the UE to perform the transmission (e.g., an uplink/downlink transmission) and the action for the UE to take based on the new format or the new parameter. For example, based on the value of the parameter (e.g., 0), the UE can perform the uplink transmission as scheduled using the sub-band configured for uplink transmission even if the sub-band includes downlink symbols. When the parameter has a different value (e.g., 1), the UE can perform the uplink transmission using the uplink symbols in the sub-band but cancel the transmission in the downlink symbols of the sub-band. In some embodiments, based on the value of the parameter (e.g., 2), the UE can cancel the uplink transmission if the UE detects that the sub-band includes downlink symbols. Another example, based on the value of the parameter (e.g., 0), the UE can perform the downlink transmission as scheduled using the sub-band configured for downlink transmission even if the sub-band includes uplink symbols. When the parameter has a different value (e.g., 1), the UE can perform the downlink transmission using the downlink symbols in the sub-band but cancel the transmission in the uplink symbols of the sub-band. In some embodiments, based on the value of the parameter (e.g., 2), the UE can cancel the downlink transmission if the UE detects that the sub-band includes uplink symbols.

In some embodiments, the UE supports the split transmission scheme and the UE is configured with one or more resources in sub-bands for the split transmission scheme. The UE can perform appropriate transmissions using resources in the sub-band according to the scheduling information. The base station can adopt a new DCI format or introduce a new parameter to indicate scheduling information for the split transmission scheme. For the case where the UE is configured with the aforementioned sub-band, the scheduling information can indicate a resource (e.g., resource B) in the sub-band for the UE to perform the transmission (e.g., an uplink/downlink transmission) and the action for the UE to take based on the new format or the new parameter. For example, based on the value of the parameter (e.g., 0), the UE can perform the uplink transmission as scheduled using resource B even if the resource B includes downlink symbols. When the parameter has a different value (e.g., 1), the UE can perform the uplink transmission using the uplink symbols in the resource B but cancel the transmission in the downlink symbols of the resource B. In some embodiments, based on the value of the parameter (e.g., 2), the UE can cancel the uplink transmission if the UE detects that the resource B includes downlink symbols. Another example, based on the value of the parameter (e.g., 0), the UE can perform the downlink transmission as scheduled using the resource B even if the resource B includes uplink symbols. When the parameter has a different value (e.g., 1), the UE can perform the downlink transmission using the downlink symbols in the resource B but cancel the transmission in the uplink symbols of the resource B. In some embodiments, based on the value of the parameter (e.g., 2), the UE can cancel the downlink transmission if the UE detects that the resource B includes uplink symbols.

In some embodiments, the base station can use the Radio Network Temporary Identifier (RNTI) value that scrambles the DCI to implicit indicate the UE behavior. For example, if the DCI signaling can be scrambled with different predefined RNTI values corresponding to different types of UE behavior. For example, if the DCI signaling is scrambled using a first predefined RNTI value, the UE can perform the uplink transmission as scheduled using resource B even if resource B includes downlink symbols. If the DCI signaling is scrambled using a second predefined RNTI value, the UE can perform the uplink transmission using the uplink symbols in resource B but cancel the transmission in the downlink symbols of resource B. If the DCI signaling is scrambled using a third predefined RNTI value, the UE can cancel the uplink transmission if the UE detects that resource B includes downlink symbols.

In the above embodiments, the base station can determine the DCI format, the parameter, and/or the RNTI value(s) based on the capability information reported by the UE. The use of the new DCI format/parameter/RNTI value(s) allows the base station to schedule transmissions under the split scheme without informing the UE of the sub-band configuration in advance.

Embodiment 2

When an aforementioned sub-band is configured by the base station (e.g., using an RRC signaling), it may be desirable to update the configuration at times. This embodiment discloses techniques that can be used to dynamically adjust or (re)configure the sub-bands using lower layer signaling (e.g., using Media Access Control (MAC) Control Element (CE) or DCI signaling).

In some embodiments, the base station can configure a set of candidate uplink or downlink sub-bands via RRC signaling. The base station then sends a MAC-CE or a DCI signaling to indicate a subset the configured sub-bands to be used for the transmission. The MAC-CE or the DCI signaling can include a sub-band index indicating a particular configured sub-band. In some embodiments, the base station sends a MAC-CE or DCI signaling to indicate updated configuration information for a sub-band that has been configured by RRC signaling.

Figure 3A:
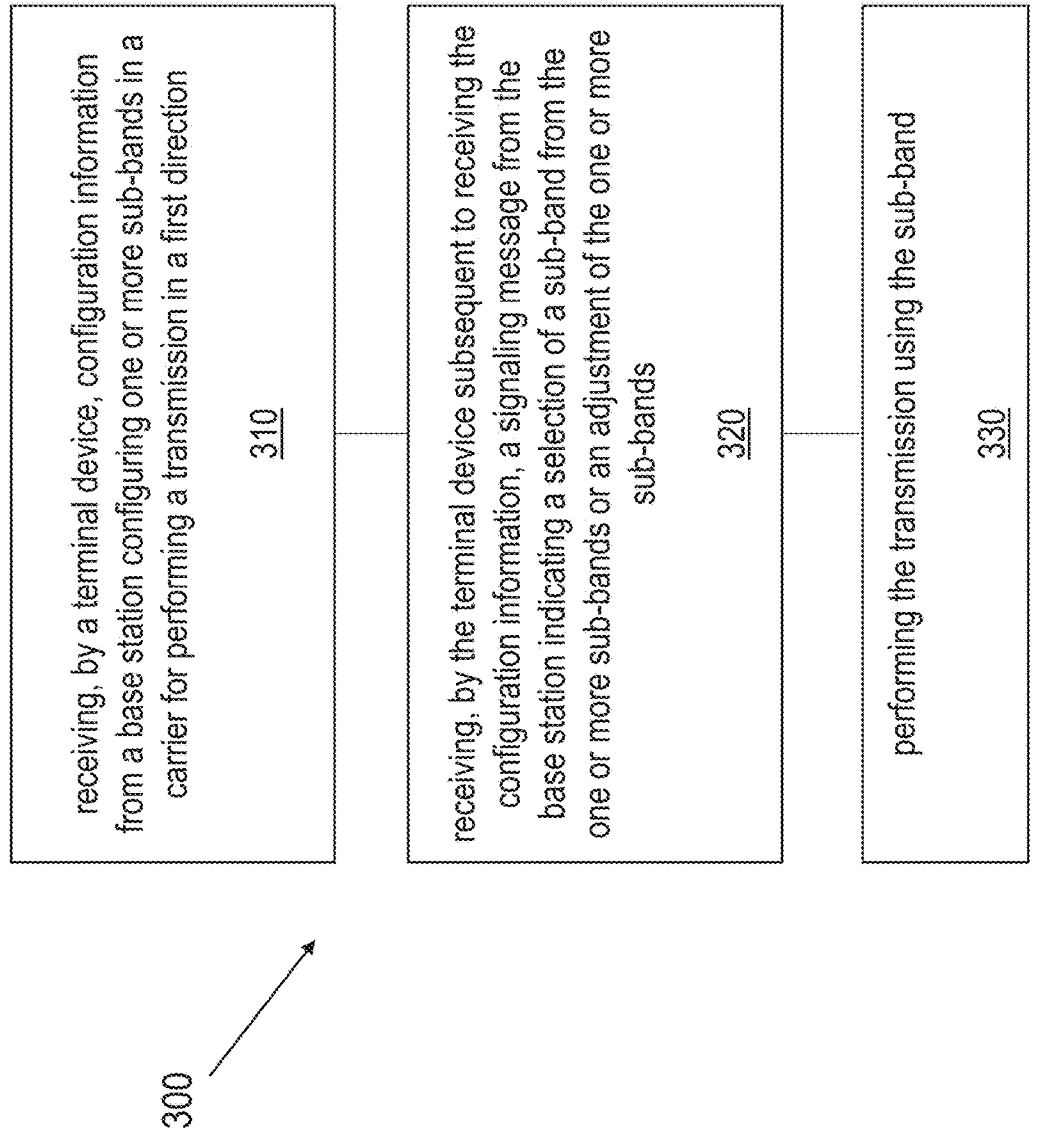
FIG. 3A is a flowchart representation of another method for wireless communication in accordance with one or more embodiments of the present technology.

FIG. 3A is a flowchart representation of a method for wireless communication in accordance with one or more embodiments of the present technology. The method 300 includes, at operation 310, receiving, by a terminal device, configuration information from a base station configuring one or more sub-bands in a carrier for performing a transmission in a first direction. The one or more sub-bands include at least one symbol configured for use in a second direction that is different than the first direction. The method 300 includes, at operation 320, receiving, by the terminal device subsequent to receiving the configuration information, a signaling message from the base station indicating a selection of a sub-band from the one or more sub-bands or an adjustment of the one or more sub-bands for performing the transmission based on the configuration information. The method 300 also includes, at operation 330, performing, by the terminal device, the transmission with the base station using the sub-band.

Figure 3B:
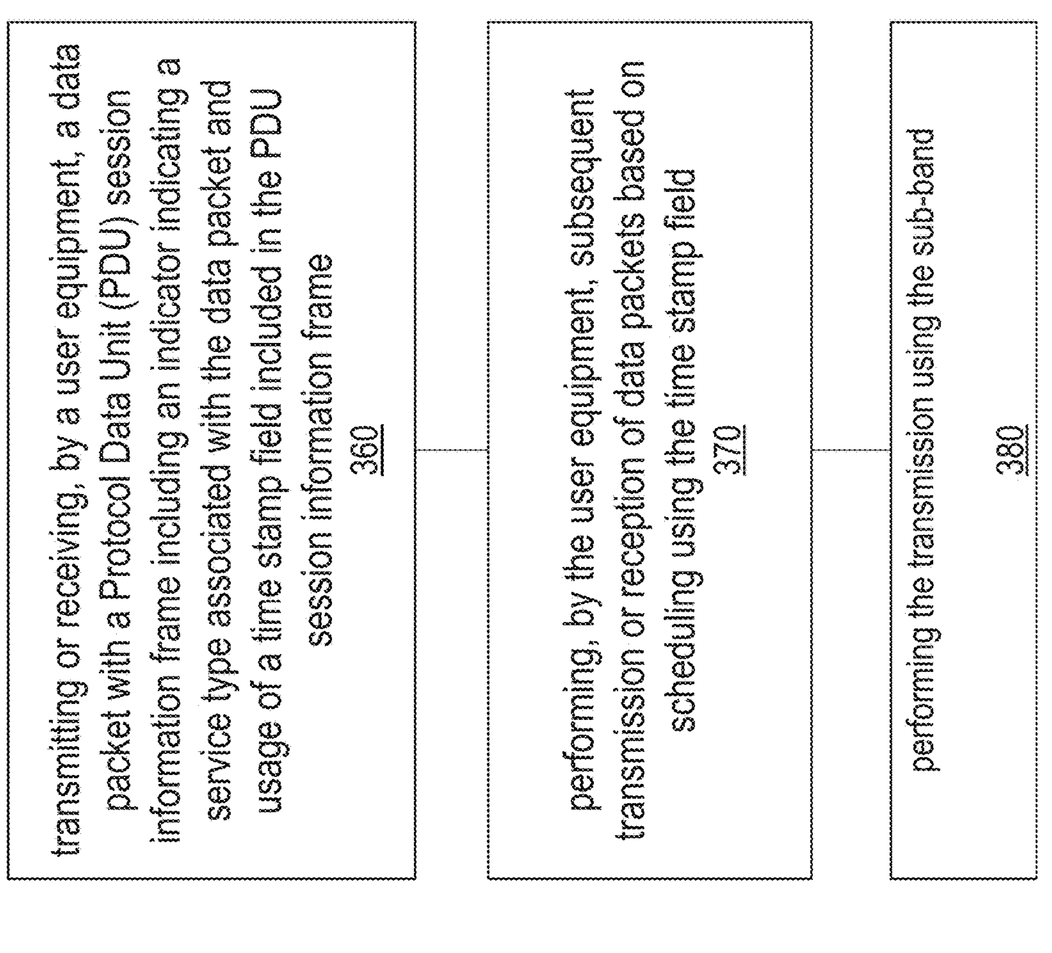
FIG. 3B is a flowchart representation of yet another method for wireless communication in accordance with one or more embodiments of the present technology.

FIG. 3B is a flowchart representation of a method for wireless communication in accordance with one or more embodiments of the present technology. The method 350 includes, at operation 360, transmitting, by a base station, configuration information to a terminal device configuring one or more sub-bands in a carrier for performing a transmission in a first direction. The one or more sub-bands include at least one symbol configured for use in a second direction that is different than the first direction. The method 350 includes, at operation 370, transmitting, by the base station subsequent to transmitting the configuration information, a signaling message to the terminal device indicating a selection of a sub-band from the one or more sub-bands or an adjustment of the one or more sub-bands for performing the transmission based on the configuration information. The method 350 also includes, at operation 380, performing by the base station, the transmission with the terminal device using the sub-band.

In some embodiments, the adjustment of the one or more sub-bands comprises adjusting a frequency-domain size of a sub-band while maintaining a frequency-domain center of the sub-band.

In some embodiments, the adjustment of the one or more sub-bands comprises adjusting both a frequency-domain size and a frequency-domain center of a sub-band.

In some embodiments, pre-defined or pre-configured frequency-domain resources in the one or more sub-bands are skipped in the adjustment.

In some embodiments, the adjustment of the one or more sub-bands comprises adjusting a time-domain position of a sub-band. In some embodiments, the time-domain position of the sub-band is represented using a time-domain unit, the time-domain unit being at least one of a slot or a symbol. In some embodiments, the adjusted sub-band comprises a subset of time-domain units of the configured sub-band. In some embodiments, pre-defined or pre-configured time-domain units in the one or more sub-bands are skipped in the adjustment.

Some examples of the disclosed techniques are further described below.

Frequency Domain Adjustments

In some embodiments, the base station can adopt new DCI format(s) or new parameter(s) in DCI signaling to indicate (or configure) the frequency-domain position and/or the frequency-domain size of the sub-band in the frequency domain. For example, the UE is configured with an uplink sub-band or a downlink sub-band via RRC signaling. The base station then sends a MAC-CE or a DCI signaling to modify the position and/or size of the configured sub-band in frequency domain. In some embodiments, the sub-band configured by MAC-CE or DCI signaling can override the original configured sub-band configuration completely or at least partially. In some embodiments, the MAC-CE or DCI signaling can include information to configure a new sub-band.

In some embodiments, the method of indicating or (re) configuring the frequency-domain position and/or the frequency-domain size of the sub-band can include one of the following information:

(1) The center frequency of the sub-band and the number of RBs on either side of the center frequency.
(2) The starting Resource Block (RB) index and/or the ending RB index of the sub-band. The sub-band includes the consecutive RBs as configured.
(3) The starting RB index of the sub-band and the number of consecutive RBs. The sub-band includes the consecutive RBs as configured.
(4) The center frequency of the sub-band. The sub-band has a pre-defined number of RBs.
(5) The starting RB of the sub-band. The sub-band includes a predefined number of RBs.
(6) The number of RBs of the sub-band. The sub-band has a pre-defined center frequency (e.g., the center frequency is at the center of the configured Bandwidth Part (BWP)).
(7) The number of RBs of the sub-band. The sub-band has a pre-defined starting RB (e.g., the starting RB is associated with a channel with a known location).

When the UE receives the MAC-CE or the DCI signaling, the UE can re-determine the position and/or the size of the configured sub-band according to the signaling. The sub-band can be configured as a common sub-band or a UE-specific sub-band. If the DCI signaling is used to indicate the sub-band or sub-band configuration, the DCI signaling can be a common DCI or a UE-specific DCI.

Figure 4:
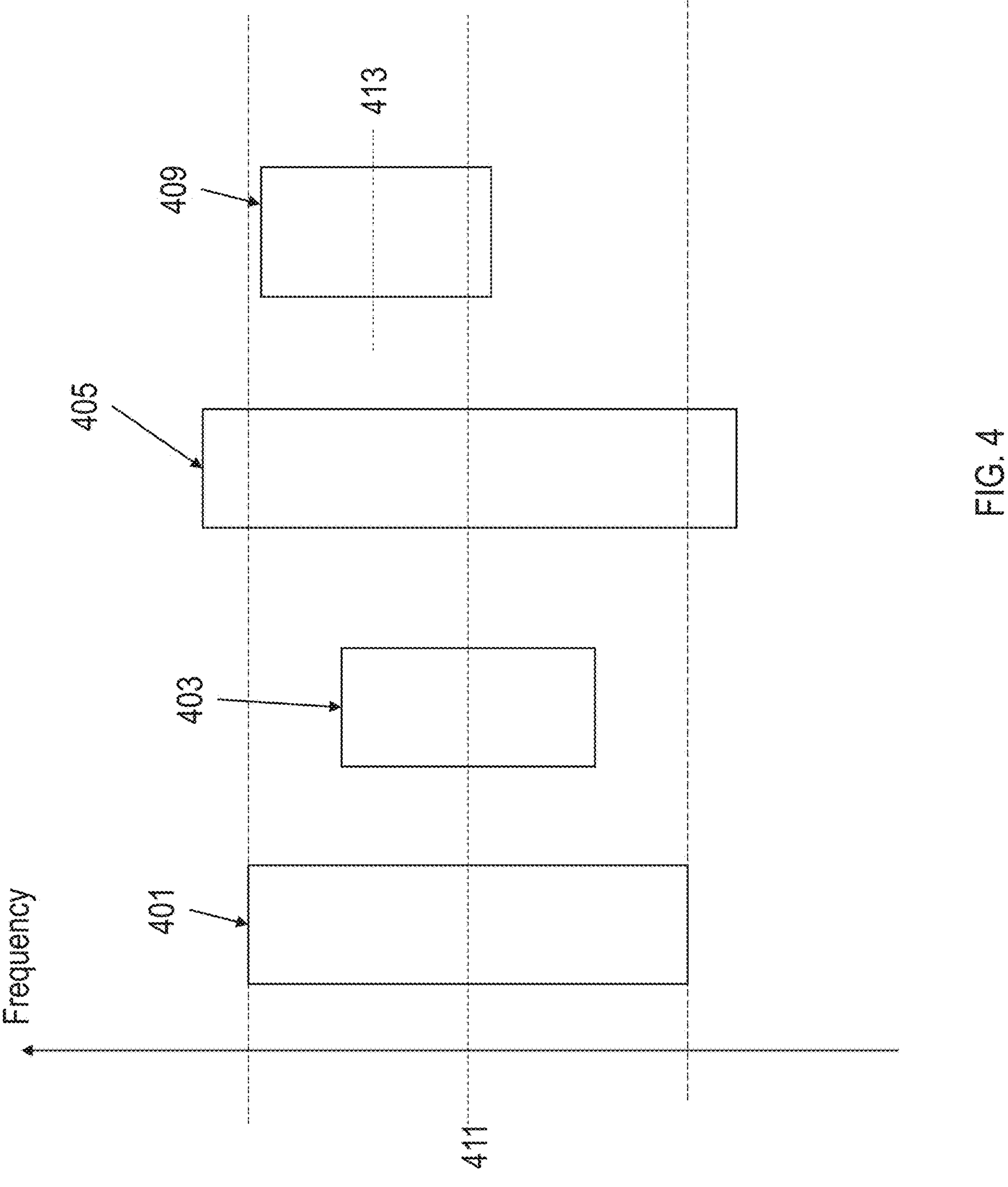
FIG. 4 illustrates an example frequency-domain reconfiguration in accordance with one or more embodiments of the present technology.

In some embodiments, to facilitate faster switching or adjustment of the sub-bands, the MAC-CE or DCI signaling includes information to update the sub-band size without drastically changing the center frequency of the sub-band. For example, FIG. 4 illustrates an example frequency-domain reconfiguration in accordance with one or more embodiments of the present technology. As shown in FIG. 4, the MAC-CE or DCI signaling can change the frequency-domain size of the configured sub-band 401 such that the newly configured sub-band 403 or 405 maintains the same center frequency 411. In some embodiments, the MAC-CE or DCI signaling indicates small changes to the center frequency of the sub-band such that the modified center frequency 413 of the sub-band 409 is still within the frequency-domain range of the originally configured sub-band. Here, the adjusted or (re)configured sub-band 409 is still a sub-band within the originally configured sub-band. In this case, the center frequencies of the sub-band 409 and the originally configured sub-band 401 are different, but sub-band 409 is still within in the frequency bandwidth of the original sub-band 401. The base station and UEs can continue to perform transmission in sub-band 409 using the bandwidth of the original sub-band 401, thereby achieving fast switching between sub-bands.

In some embodiments, the frequency position and size of the sub-band can be adjusted independently. In some embodiments, the frequency position and the size are adjusted together.

In some embodiments, the configured sub-band may include predefined resource blocks or resource elements (e.g., one subcarrier in the frequency domain) configured to support predetermined operations (e.g., legacy UE operations or other operations predefined by the base station and/or UE). These predefined resource blocks or resource elements are skipped or excluded from the configured sub-band for the transmissions under the split scheme, thereby allowing backward compatibility for legacy UEs or other legacy operations.

Time Domain Adjustments

In some embodiments, the base station can adopt new DCI format(s) or new parameter(s) in DCI signaling to indicate (or configure) the time domain location of the sub-band using time units, such as symbols, slots, and/or a combination of symbols and slots. For example, the time-domain position of the sub-band can be described using a starting position of the time unit (e.g., slot or symbol) and the size (e.g., how many consecutive time-domain units are included in the sub-band). The starting position can be carried in the MAC-CE or DCI signaling. The starting position can also be inherently indicated using the time-unit (e.g., slot or symbol) in which the MAC-CE or DCI signaling is transmitted/received (e.g., the slot in which the DCI is located and/or the last symbol of the Physical Downlink Channel or CORESET in which the DCI is located). In some embodiments, the time-domain position of the sub-band can be indicated using periodic time-domain units (e.g., slots or symbols). For example, the signaling can carry information indicating that, starting from a particular time-domain position, a period of N number of time-domain units (e.g., symbols) is part of the sub-band.

The indication of the time-domain configuration information can be performed in conjunction with or separately from the frequency-domain configuration. For example, the UE is configured with an uplink sub-band or a downlink sub-band via RRC signaling. The base station then sends a MAC-CE or a DCI signaling to modify the time-domain position of the sub-band. In some embodiments, the sub-band configured by MAC-CE or DCI signaling can override the original configured sub-band configuration completely or at least partially. In some embodiments, the MAC-CE or DCI signaling can include information to configure a new sub-band.

When the UE receives the MAC-CE or the DCI signaling, the UE can re-determine the time-domain position of the configured sub-band according to the signaling. The sub-band can be configured as a common sub-band or a UE-specific sub-band. If the DCI signaling is used to indicate the sub-band or sub-band configuration, the DCI signaling can be a common DCI or a UE-specific DCI.

Figure 5:
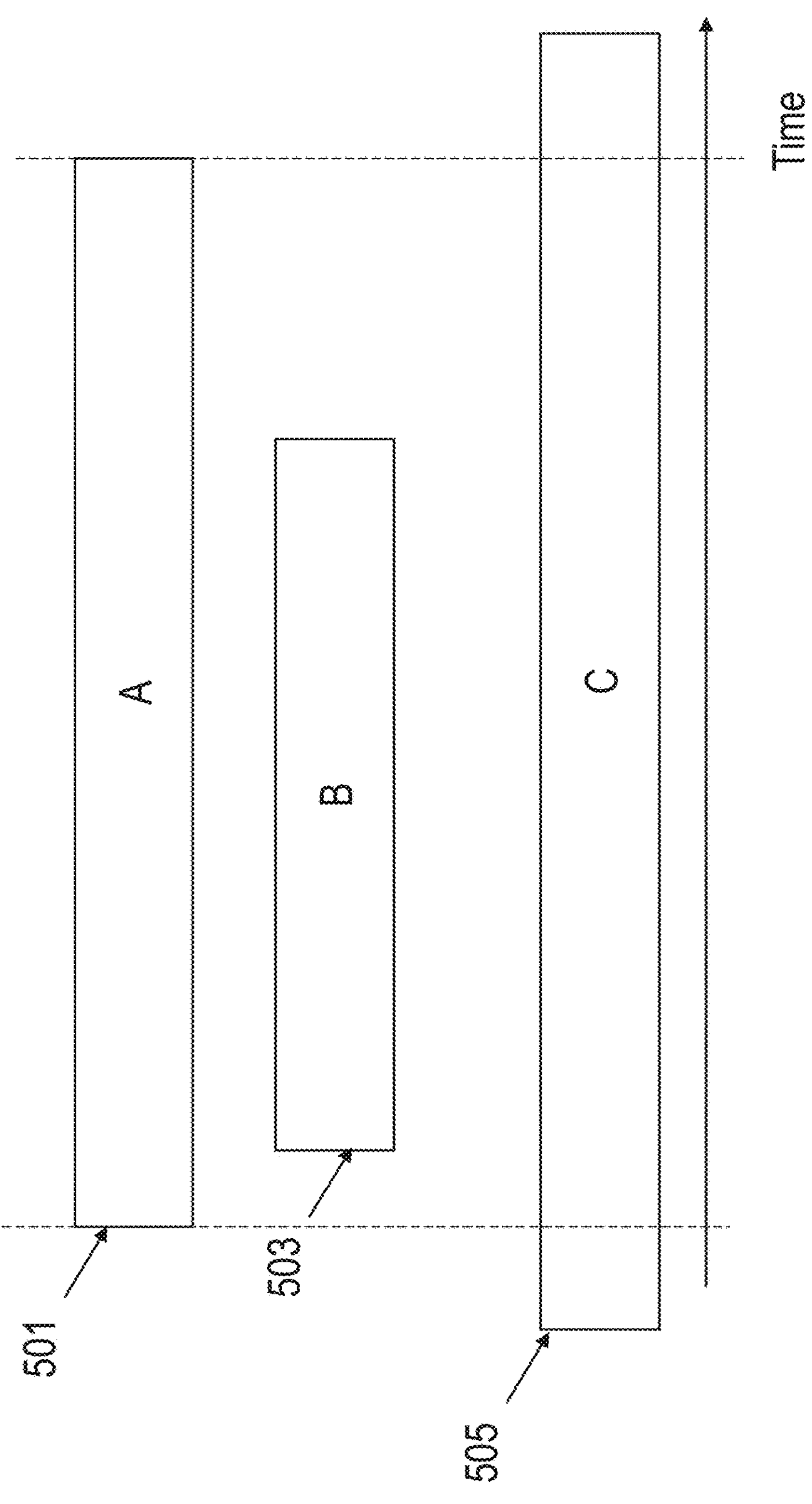
FIG. 5 illustrates an example time-domain reconfiguration in accordance with one or more embodiments of the present technology.

In some embodiments, to facilitate faster switching or adjustment of the sub-bands, the MAC-CE or DCI signaling includes information to reconfigure the sub-band based on the original time-domain position and size of the sub-band. In some embodiments, the signaling includes information to reduce the time domain size of the sub-band so that the re-configured sub-band uses a subset of the time-domain resources of the originally configured the sub-band. For example, FIG. 5 illustrates an example time-domain reconfiguration in accordance with one or more embodiments of the present technology. As shown in FIG. 5, the sub-band 501 is configured with a set of time-domain units (e.g., frames, slots, or symbols), referred to as set A. The MAC-CE or the DCI signaling includes configuration information to update the sub-band 503 to have a subset of time-domain units, referred to as set B (that is, set B is a subset of set A). In some embodiments, the signaling includes information to increase the time domain size of the sub-band so that the originally configured sub-band uses a subset of the time-domain resources of the reconfigured sub-band. For example, as shown in FIG. 5, the MAC-CE or the DCI signaling includes configuration information to update the sub-band 505 to have a set of time-domain units, referred to as set C (that is, set A is a subset of set C). In some embodiments, the time-domain position and size can be adjusted independently. In some embodiments, the time-domain position and the size are adjusted together.

Figure 6:
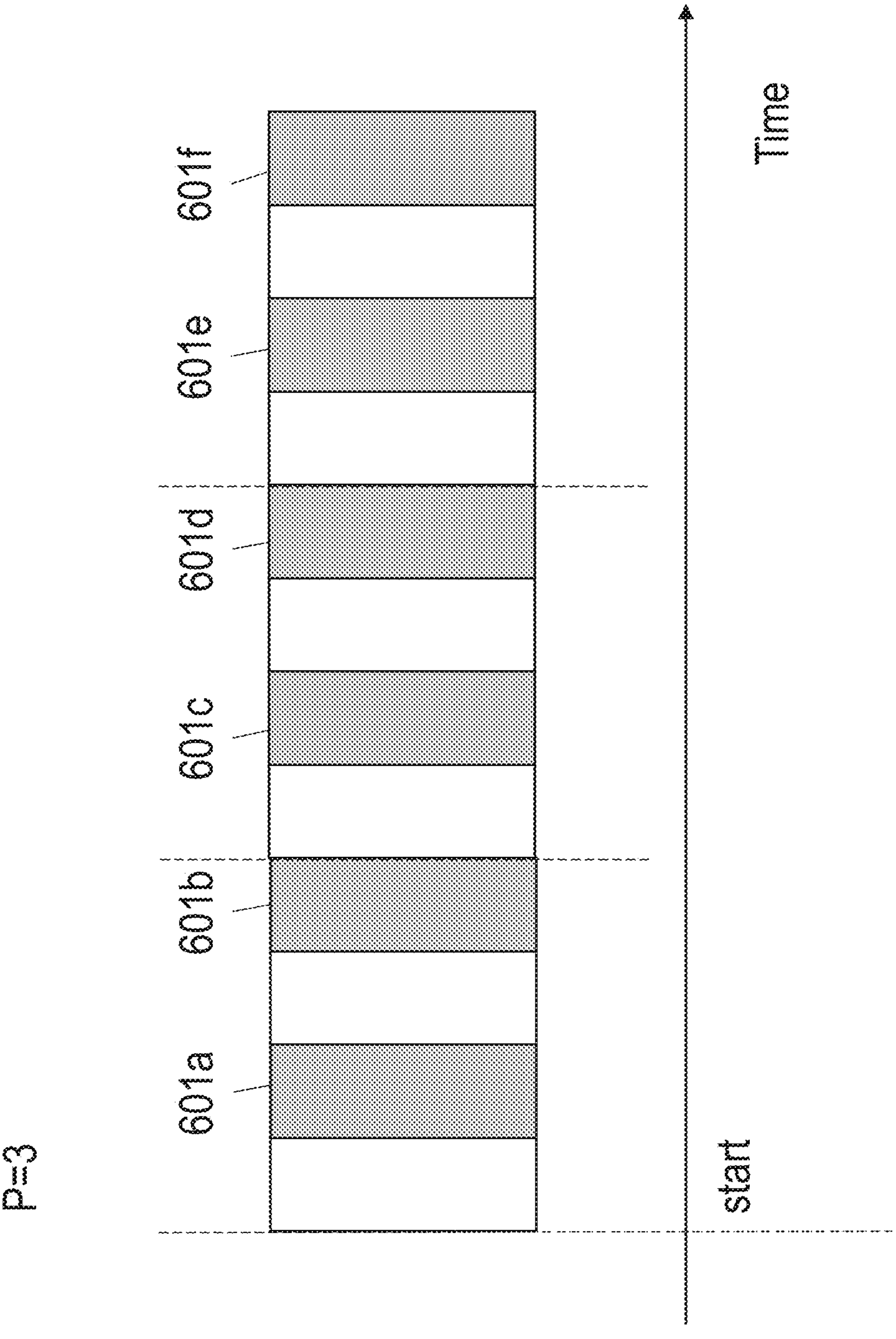
FIG. 6 illustrates another example time-domain reconfiguration in accordance with one or more embodiments of the present technology.

In some embodiments, the sub-band includes part or all of the symbols in a slot of the configured slots. The MAC-CE or DCI signaling further indicates which symbols in the slot are configured for the sub-band. For example, FIG. 6 illustrates another example time-domain reconfiguration in accordance with one or more embodiments of the present technology. As shown in FIG. 6, the signaling carries or indicates information for determining the starting position of the sub-band (e.g., a slot). The signaling also includes information about a period of slots/a number of slots (e.g., P=3) and information about the selected symbols 601*a*-601*f* in each of the slot that are used for the sub-band.

In some embodiments, the time-domain position of the sub-band is described in a DCI signaling based on the slot. The DCI signaling (functions) can include one of the following information:

(1) The number of consecutive slots that are used as the time-domain position of the sub-band starting from the slot where the DCI is located.

(2) The number of consecutive slots that are used as the time-domain position of the sub-band starting from a certain slot pre-defined or indicated by the DCI. Wherein the pre-defined slot can be the first slot that satisfies a pre-defined timeline.

(3) In a period of N (e.g., N is the number of slots) starting from the slot where the DCI is located, the determined slots are used as the time-domain position of the sub-band.

(4) In a period of N (e.g., N is the number of slots) starting from a certain slot pre-defined or indicated by the DCI, the determined slots used as the time-domain position of the sub-band. Wherein the pre-defined slot can be the first slot that satisfies a pre-defined timeline.

In some embodiments, the time-domain position of the sub-band is described in a DCI signaling based on the OFDM symbol. Specific DCI signaling functions include one of the following: 1) starting from the last symbol of the PDCCH or CORESET where the DCI is located, how many consecutive symbols are used as the time-domain position of the sub-band; 2) starting from a certain OFDM symbol indicated by the DCI, how many consecutive OFDMs are used as the time-domain position of the sub-band. Wherein the pre-defined OFDM symbol is the first OFDM symbol that satisfies a pre-defined timeline; 3) starting from the last symbol of the PDCCH or CORESET where the DCI is located, with a period of M (M is the number of symbols), a series of OFDM symbols determined as the time-domain position of the sub-band; 4) starting from a certain OFDM symbol indicated by the DCI, with a period of M (M is the number of symbols), a series of OFDM symbols determined as the time-domain position of the sub-band. Wherein the pre-defined OFDM symbol is the first OFDM symbol that satisfies a pre-defined timeline; 5) the OFDM symbols configured as sub-bands in each slot are described using bitmap signaling.

In some embodiments, the time-domain position of the sub-band is described in a DCI signaling based on the slot and OFDM symbol. Specific DCI signaling functions include two aspects: indicating the slots for the sub-band based on the above-mentioned method for determining the time-domain position of the sub-band based on the slot; indicating which OFDM symbols in the determined slots are configured as the sub-band based on the above-mentioned method for determining the time-domain position of the sub-band based on the OFDM symbol.

In some embodiments, the configured sub-band may include predefined slot or resource elements (e.g., one symbol in the time domain) configured to support predetermined operations (e.g., legacy UE operations or other operations predefined by the base station and/or UE). These predefined slot or resource elements are skipped or excluded from the configured sub-band for the transmissions under the split scheme, thereby allowing backward compatibility for legacy UEs or other legacy operations.

Some embodiments may preferably implement the following solutions. A set of preferred solutions may include the following (e.g., as described with reference to Embodiments 1-2).

1. A method for wireless communication, comprising receiving, by a terminal device, scheduling information from a base station indicating a resource for a transmission in a first direction, and wherein the resource comprises at least one symbol configured for use in a second direction that is different than the first direction; and performing, by the terminal device, the transmission with the base station in the first direction using the at least one symbols in the resource.

2. The method of solution 1, further comprising reporting, by the terminal device, capability information to the base station indicating support for performing transmissions in the first direction using the resource.

3. The method of solution 1 or 2, further comprising receiving, by the terminal device, configuration information for a sub-band of a carrier from the base station in a Radio Resource Control (RRC) signaling, wherein the configuration information specifies that the sub-band is configured for transmissions in the first direction, wherein the resource is positioned in the sub-band, and wherein the sub-band includes symbols for use in the second direction.

4. A method for wireless communication, comprising transmitting, by a base station, scheduling information to a user equipment indicating a resource for a transmission in a first direction, and wherein the resource comprises at least one symbol configured for use in a second direction that is different than the first direction; and performing, by the base station, the transmission with the terminal device in the first direction using the at least one symbols in the resource.

5. The method of solution 4, further comprising receiving, by the base station, capability information from the terminal device indicating support for performing transmissions in the first direction using the resource.

6. The method of solution 4 or 5, further comprising transmitting, by the base station, configuration information for a sub-band of a carrier to the terminal device in a Radio Resource Control (RRC) signaling, wherein the configuration information specifies that the sub-band is configured for transmissions in the first direction, wherein the resource is positioned in the sub-band, and wherein the sub-band includes symbols for use in the second direction.

7. The method of any of solution 1 to 6, wherein the scheduling information is carried in a Downlink Control Information signaling.

8. The method of any of solution 1 to 7, wherein the first direction is an uplink direction from the terminal device to the base station or a downlink direction from the base station to the terminal device.

9. A method for wireless communication, comprising receiving, by a terminal device, configuration information from a base station configuring one or more sub-bands in a carrier for performing a transmission in a first direction, wherein the one or more sub-bands include at least one symbol configured for use in a second direction that is different than the first direction; receiving, by the terminal device subsequent to receiving the configuration information, a signaling message from the base station indicating a selection of a sub-band from the one or more sub-bands or an adjustment of the one or more sub-bands for performing the transmission based on the configuration information; and performing, by the terminal device, the transmission with the base station using the sub-band.

10. A method for wireless communication, comprising transmitting, by a base station, configuration information to a terminal device configuring one or more sub-bands in a carrier for performing a transmission in a first direction, wherein the one or more sub-bands include at least one symbol configured for use in a second direction that is different than the first direction; transmitting, by the base station subsequent to transmitting the configuration information, a signaling message to the terminal device indicating a selection of a sub-band from the one or more sub-bands or an adjustment of the one or more sub-bands for performing the transmission based on the configuration information; and performing by the base station, the transmission with the terminal device using the sub-band.

11. The method of solution 9 or 10, wherein the adjustment of the one or more sub-bands comprises adjusting a frequency-domain size of a sub-band while maintaining a frequency-domain center of the sub-band.

12. The method of solution 9 or 10, wherein the adjustment of the one or more sub-bands comprises adjusting both a frequency-domain size and a frequency-domain center of a sub-band.

13. The method of solution 11 or 12, wherein pre-defined or pre-configured frequency-domain resources in the one or more sub-bands are skipped in the adjustment.

14. The method of solution 9 or 10, wherein the adjustment of the one or more sub-bands comprises adjusting a time-domain position of a sub-band.

15. The method of solution 14, wherein the time-domain position of the sub-band is represented using a time-domain unit, the time-domain unit being at least one of a slot or a symbol.

16. The method of solution 14 or 15, wherein the adjusted sub-band comprises a subset of time-domain units of the configured sub-band.

17. The method of any of solution 15 to 16, wherein pre-defined or pre-configured time-domain units in the one or more sub-bands are skipped in the adjustment.

18. A communication apparatus, comprising a processor configured to implement a method recited in any one or more of solutions 1 to 17.

19. A computer program product having code stored thereon, the code, when executed by a processor, causing the processor to implement a method recited in any one or more of solutions 1 to 17.

Figure 7:
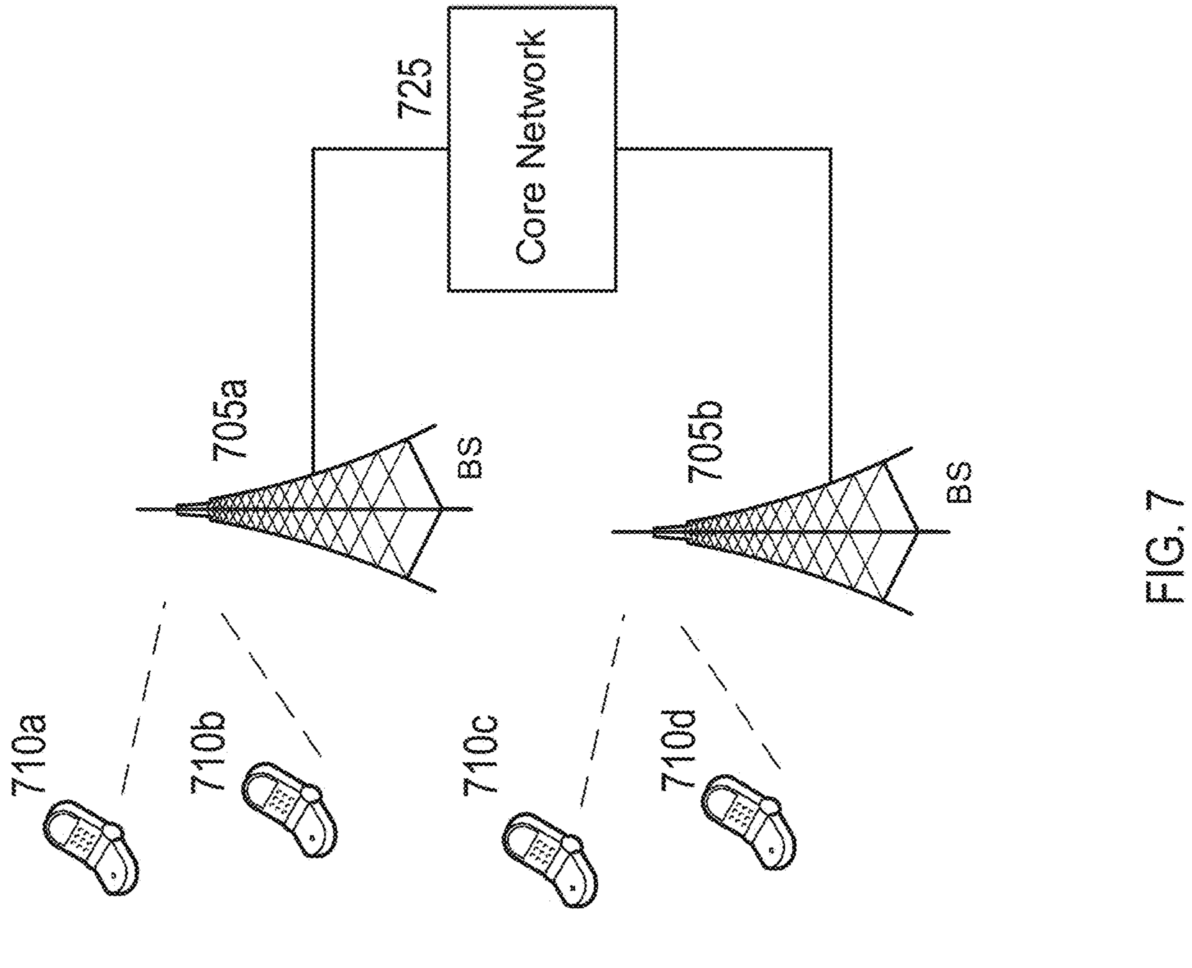
FIG. 7 shows an example of a wireless communication system where techniques in accordance with one or more embodiments of the present technology can be applied.

FIG. 7 shows an example of a wireless communication system 700 where techniques in accordance with one or more embodiments of the present technology can be applied. A wireless communication system 700 can include one or more base stations (BSs) 705*a*, 705*b*, one or more wireless devices (or UEs) 710*a*, 710*b*, 710*c*, 710*d*, and a core network 725. A base station 705*a*, 705*b* can provide wireless service to user devices 710*a*, 710*b*, 710*c* and 710*d* in one or more wireless sectors. In some implementations, a base station 705*a*, 705*b* includes directional antennas to produce two or more directional beams to provide wireless coverage in different sectors. The core network 725 can communicate with one or more base stations 705*a*, 705*b*. The core network 725 provides connectivity with other wireless communication systems and wired communication systems. The core network may include one or more service subscription databases to store information related to the subscribed user devices 710*a*, 710*b*, 710*c*, and 710*d*. A first base station 705*a* can provide wireless service based on a first radio access technology, whereas a second base station 705*b* can provide wireless service based on a second radio access technology. The base stations 705*a* and 705*b* may be co-located or may be separately installed in the field according to the deployment scenario. The user devices 710*a*, 710*b*, 710*c*, and 710*d* can support multiple different radio access technologies. The techniques and embodiments described in the present document may be implemented by the base stations of wireless devices described in the present document.

Figure 8:
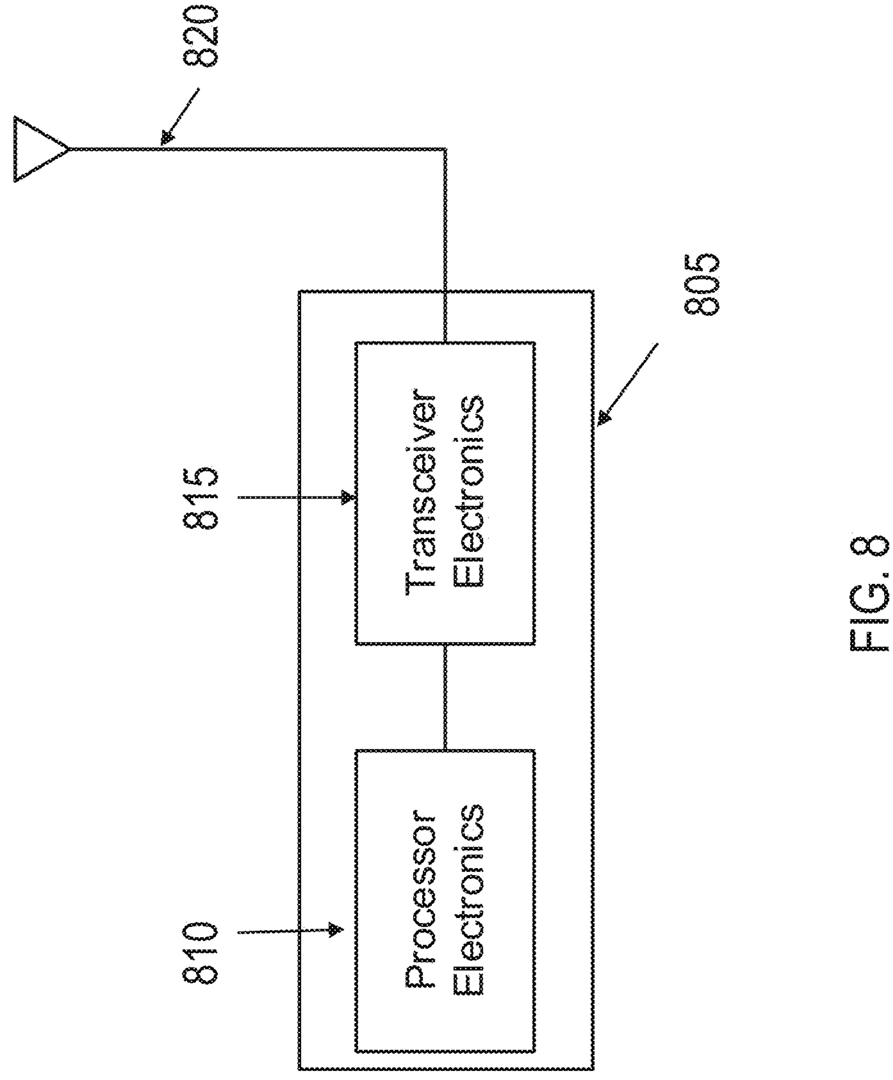
FIG. 8 is a block diagram representation of a portion of a radio station in accordance with one or more embodiments of the present technology can be applied.

FIG. 8 is a block diagram representation of a portion of a radio station in accordance with one or more embodiments of the present technology can be applied. A radio station 805 such as a network node, a base station, or a wireless device (or a user device, UE) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805. In some embodiments, the radio station 805 may be configured to perform the methods described herein.

It will be appreciated that the present document discloses techniques that can be embodied in various embodiments to facilitate the efficient scheduling of the split transmission scheme in which the base station performs full-duplex transmissions and the UE performs half-duplex transmissions for TDD systems. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:

receiving, by a terminal device, configuration information for a sub-band from a base station, wherein the configuration information specifies that the sub-band is configured for transmissions in a first direction, and the sub-band is configured in one or more symbols that are in a second direction that is different than the first direction, receiving, by the terminal device, scheduling information from the base station indicating a resource for a transmission in the first direction, wherein the resource comprises at least one symbol in the one or more symbols that are in the second direction, and the resource is positioned in the sub-band, and performing, by the terminal device, the transmission with the base station in the first direction using the resource, wherein the sub-band is configured by indicating a starting resource block (RB) index of the sub-band and a number of consecutive RBs.

2. The method of claim 1, wherein:

the sub-band is configured by indicating a slot for the sub-band in a time-domain position and a symbol for the sub-band in the indicated slot in the time-domain position.

3. The method of claim 1, wherein:

the first direction is a uplink; and the second direction is a downlink.

4. A method for wireless communication, comprising:

sending, by a base station, configuration information for a sub-band to a terminal device, wherein the configuration information specifies that the sub-band is configured for transmissions in a first direction, and the sub-band is configured in one or more symbols that are in a second direction that is different than the first direction, sending, by the base station, scheduling information to the terminal device indicating a resource for a transmission in the first direction, wherein the resource comprises at least one symbol in the one or more symbols that are in the second direction, and the resource is positioned in the sub-band, and receiving, by the base station, the transmission with the terminal device in the first direction using the resource, wherein the sub-band is configured by indicating a starting RB index of the sub-band and a number of consecutive RBs.

5. The method of claim 4, wherein:

the sub-band is configured by indicating a slot for the sub-band in a time-domain position and a symbol for the sub-band in the indicated slot in the time-domain position.

6. The method of claim 4, wherein:

the first direction is a uplink; and the second direction is a downlink.

7. A terminal device for wireless communication, the terminal device comprising:

a memory storing instructions; and at least one processor in communication with the memory, wherein, when the at least one processor executes the instructions, the at least one processor is configured to cause the terminal device to perform:

receiving configuration information for a sub-band from a base station, wherein the configuration information specifies that the sub-band is configured for transmissions in a first direction, and the sub-band is configured in one or more symbols that are in a second direction that is different than the first direction, receiving scheduling information from the base station indicating a resource for a transmission in the first direction, wherein the resource comprises at least one symbol in the one or more symbols that are in the second direction, and the resource is positioned in the sub-band, and performing the transmission with the base station in the first direction using the resource, wherein the sub-band is configured by indicating a starting RB index of the sub-band and a number of consecutive RBs.

8. The terminal device of claim 7, wherein:

the sub-band is configured by indicating a slot for the sub-band in a time-domain position and a symbol for the sub-band in the indicated slot in the time-domain position.

9. The terminal device of claim 7, wherein:

the first direction is a uplink; and the second direction is a downlink.

10. A base station for wireless communication, the base station comprising:

a memory storing instructions; and at least one processor in communication with the memory, wherein, when the at least one processor executes the instructions, the at least one processor is configured to cause the base station to perform:

sending configuration information for a sub-band to a terminal device, wherein the configuration information specifies that the sub-band is configured for transmissions in a first direction, and the sub-band is configured in one or more symbols that are in a second direction that is different than the first direction, sending scheduling information to the terminal device indicating a resource for a transmission in the first direction, wherein the resource comprises at least one symbol in the one or more symbols that are in the second direction, and the resource is positioned in the sub-band, and receiving the transmission with the terminal device in the first direction using the resource, wherein the sub-band is configured by indicating a starting RB index of the sub-band and a number of consecutive RBs.

11. The base station of claim 10, wherein:

the sub-band is configured by indicating a slot for the sub-band in a time-domain position and a symbol for the sub-band in the indicated slot in the time-domain position.

12. The base station of claim 10, wherein:

the first direction is a uplink; and the second direction is a downlink.

* * * * *